(12) United States Patent
Chen et al.

(10) Patent No.: US 10,364,511 B1
(45) Date of Patent: *Jul. 30, 2019

(54) MAGNETO DIELECTRIC COMPOSITE MATERIALS AND MICROWAVE APPLICATIONS THEREOF

(71) Applicants: Xing Chen, Plainfield, IL (US); Ziyao Zhou, Woodridge, IL (US)

(72) Inventors: Xing Chen, Plainfield, IL (US); Ziyao Zhou, Woodridge, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 299 days.

This patent is subject to a terminal disclaimer.

(21) Appl. No.: 15/279,867

(22) Filed: Sep. 29, 2016

Related U.S. Application Data

(63) Continuation-in-part of application No. 15/240,168, filed on Aug. 18, 2016, and a continuation-in-part of application No. 15/082,901, filed on Mar. 28, 2016, now Pat. No. 9,620,839, and a continuation of application No. 14/803,339, filed on Jul. 20, 2015, now abandoned.

(51) Int. Cl.
| | | |
|---|---|---|
| *D01D 5/00* | (2006.01) | |
| *B33Y 10/00* | (2015.01) | |
| *B33Y 30/00* | (2015.01) | |

(52) U.S. Cl.
CPC ............ *D01D 5/0092* (2013.01); *B33Y 10/00* (2014.12); *B33Y 30/00* (2014.12); *D10B 2401/00* (2013.01)

(58) Field of Classification Search
CPC ...... D01D 5/0092; B33Y 10/00; B33Y 30/00; D10B 2401/00; H01P 1/00–11/00
See application file for complete search history.

(56) References Cited

U.S. PATENT DOCUMENTS

2015/0137904 A1* 5/2015 Kim .................... C25D 11/045
333/1.1

* cited by examiner

*Primary Examiner* — Elizabeth M Cole
(74) *Attorney, Agent, or Firm* — Cherskov Flaynik & Gurda, LLC

(57) ABSTRACT

A system for incorporating ferromagnetic materials into several microwave application is described. The system employs a multi-layer substrate. A substrate for receiving microwave signals uses a base layer which has tunable elements and a nanofiber layer which uses magnetic nanotubes. The nanofibers have a high aspect ratio and the nanofiber layer is embedded in the base layer.

12 Claims, 13 Drawing Sheets

MAGNETO DIELECTRIC COMPOSITE MATERIALS AND MICROWAVE APPLICATIONS THEREOF

PRIORITY CLAIM

This application claims priority as a continuation in part of U.S. application Ser. No. 15/240,168, filed on Aug. 18, 2016, presently pending, which in turn claims priority as a continuation of Ser. No. 14/803,339, filed on Jul. 20, 2015, presently abandoned, the contents of each of which are hereby incorporated by reference. This application also claims priority as a continuation in part of U.S. application Ser. No. 15/082,901 filed on Mar. 28, 2016, presently pending, which in turn claimed priority as a continuation in part of U.S. application Ser. No. 14/803,339, filed on Jul. 20, 2015, presently abandoned, the contents of each of which are hereby incorporated by reference.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

The field of the invention is tunable microwave antenna, and other devices employing a tuneable composite having magnetodielectric properties.

2. Background of the Invention

In various embodiments, the invention provides an antenna for microwave signals capable of receiving microwave signals at different frequencies. In another embodiment, the invention comprises a magnetodielectric composite substrate which is used to receive rf signals of various frequencies, especially in the microwave bands.

In one embodiment, the invention comprises a nanofiber composite having the smallest possible physical profile suitable for use in a patch antenna application. The nanofiber elements of the composite are arranged to result in optimized magnetic anisotropy and much-improved microwave properties, especially as compared with substrates with dielectric materials only, without magnetic elements.

Traditionally, due to limitations inherent in materials, radio wave reception antennas had to be built and optimized to receive only a narrow range of frequencies, especially for antennas operating in the microwave frequency range due to the limitation of substrate materials. In the instant invention, the magnetic loading of dielectric microstrip receiving substrate maximizes the bandwidth, minimizes loss, and allows for matching of impedance, while minimizing device space requirements.

A need exists in the art for a device that can accommodate reception of various microwave signals for the purpose of receiving information in the electromagnetic spectrum.

SUMMARY OF INVENTION

An object of the invention is to create a device and method of interacting microwave signals using magnetic nanofiber composite structures. An advantage of the invention is that it allows for building of several different types of radio frequency equipment, including, an optimum and flexible antenna, and others.

An additional object of the invention is to provide an antenna where its impedance is controllable by substrate materials composition. A feature of the invention is that the addition of magnetic loading allows the tuning or matching of impedance within the antenna substrate material (by tuning the ratio of magnetic permeability and dielectric permittivity. A benefit of the invention is that impedance matching can be achieved without resorting to adjusting the geometry of the antenna, which removes significant constraints on antenna design.

A further object of the invention is to provide a signal reception composite which does not contain conductive paths. A feature of the system is that, in one embodiment, the nanofiber layer is coated with $Al_2O_3$. In further embodiments, the coating includes other oxides such as NiO and $Fe_2O_3$, or $Co_3O_4$. A benefit of the system is that it allows for use of metallic magnetic materials without creating the risk of forming conductive paths within the composite that would render the substrate an unsuitable antenna.

Another object of the invention is to provide a signal reception composite having metallic magnetic elements. A feature of the invention is that it uses nanofiber structure combined with $Al_2O_3$ coating which allows for introduction of metallic magnetic materials. A benefit of the invention is that it has much stronger magnetization than oxide materials such as ferrite, which could not be used in conventional applications because of the high electrical loss An additional object of the invention is to provide an adaptive antenna array, which can identify the spatial direction of signal arrival and adapt the radiation pattern to focus at the signal source. A feature of the invention is that an array of tunable nanofiber substrates may be used to calculate signal direction vectors and adjust the array in response to same. Further, inasmuch as in one embodiment the array uses electric field bias control, the embodiment is very energy efficient. A benefit of the invention is that in some embodiments, the nanofiber substrate can operate in conditions that prior art devices could not.

A further object of the invention is to provide a device for beam forming and steering. A feature of the invention is that, in one embodiment, the nanofiber containing antenna is used to tune the radiation frequency and radiation polarization by magnetically biasing the substrate. A benefit of the invention is that the resulting transmitted beam may be shaped in response to prevailing conditions. This tuning can be achieved by applying external magnetic field to the substrate. However, this way requires magnetic coil, which is space consuming, and energy-inefficient. In one embodiment, the system uses a core-shell fiber structure where core material is metallic magnetic material with magnetostriction, while the shell material is piezoelectric (and also insulating). With this structure, the magnetic bias can be induced by electric field instead of external magnetic field, and can be much more space and energy efficient.

A further object of the invention is to facilitate the large scale manufacturing of a flexible antenna. A feature of the invention is that, in one embodiment, the nanofiber components are optionally coated with an insulating layer and the coated nanofiber components are in turn printed on a polymer base. A benefit of the invention is that the resulting substrate may be manufactured on a wide scale.

An additional object of the invention is to provide a flexible substrate. In one embodiment, a feature of the invention is the high aspect ratio nanofibers are non-overlapping and so the embodiment can conform to a variety of supporting shapes, as would be the case for internal components of a multi-purpose computing device. A benefit of the system is that it allows for installation of the device in any number of possible environments and applications.

A substrate for receiving microwave signals is described, the substrate comprising a base layer having tunable elements; and a nanofiber layer comprising magnetic nanofibers; wherein said nanofibers have a high aspect ratio and wherein said nanofiber layer is embedded in the base layer resulting in a substrate having magneto-electrically coupled elements.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1A:
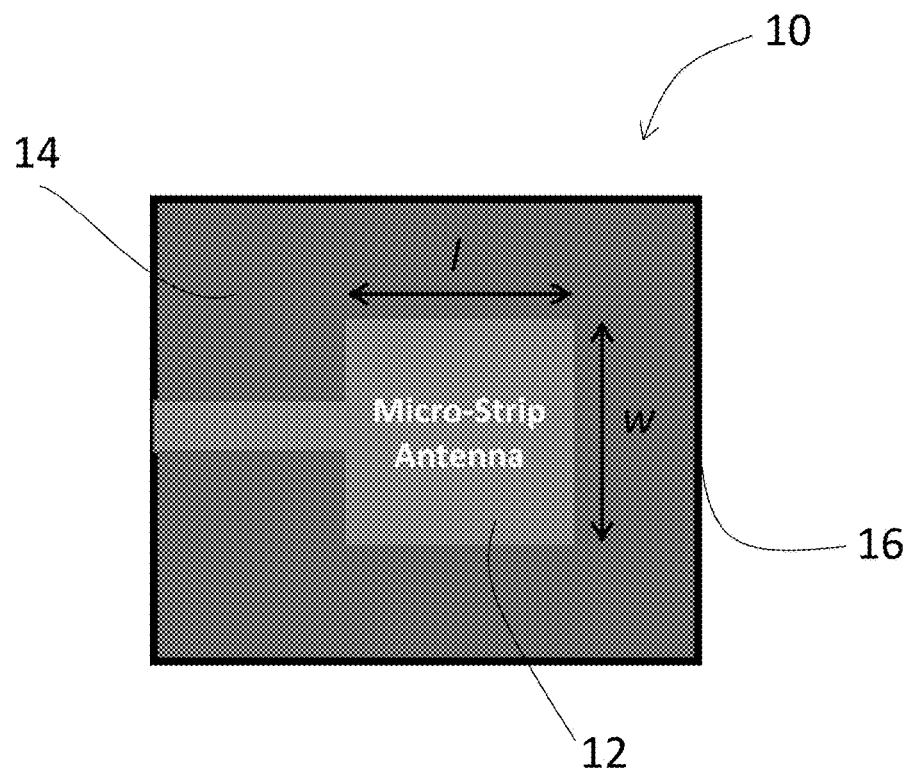
FIGS. 1A and 1B depict several embodiments of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1B:
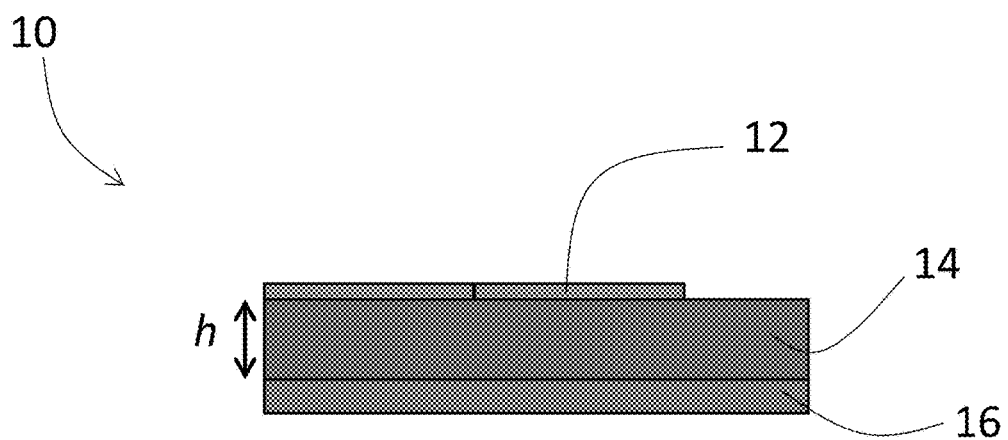

As shown in FIGS. 1A and 1B, patch antennas 10 used to receive or transmit radio frequency signals rely on a metallic antenna 12, a dielectric substrate 14, and a ground plate 16. A top view is depicted in FIG. 1A and a side view is shown in FIG. 1B. The antenna size (as provided by the dimensions l and w of the antenna 12) is scaled for each wavelength. Wavelength inside the dielectric material is expressed as:

$$\lambda = \frac{\lambda_0}{\sqrt{\varepsilon}}$$

where $\lambda_0$ is the wavelength in free space and dielectric permittivity is $\varepsilon$.

In conventional patch antennas, the permittivity cannot be adjusted indefinitely, as the total bandwidth of the antenna using a dielectric substrate is inversely related to the permittivity $\varepsilon$:

$$\text{Bandwidth scales with } \frac{1}{\varepsilon}$$

Current approaches include using a moderate-permittivity substrate and increasing the thickness distance h (shown in FIG. 1B) between the antenna 12 and the ground plate 16. These approaches result in inefficient antennas. Conventional patch antennas have narrow operational bandwidths, and significantly decrease device battery life. Most device manufacturers therefore incorporate multiple antennas into a device, and selectively power only a few of the antennas at a time, resulting in a loss of functionality for the end user.

Several embodiments of the system will be described in terms of sending and receiving radio frequency signals in the Microwave Communication range (operating at 0.1 GHz to 10 GHz). However, the system described below and the method of manufacturing is not constrained to a narrow range of physical dimensions and can therefore be used with any frequency suitable for a patch antenna.

In one embodiment, the device comprises adding a magnetic element to the substrate 12. A magnetic element has a permeability value $\mu$ (expressed in both real $\mu'$ and imaginary $\mu''$ components). The device dimension can be reduced by a factor of the permeability while maintaining the same operating frequency and without suffering a bandwidth penalty. Specifically:

$$\text{Dimension} = \frac{1}{\sqrt{\mu\varepsilon}}$$

As shown in the following equation, the total bandwidth is a function of both the permeability ($\mu$) and permittivity ($\varepsilon$):

$$BW = \frac{96\sqrt{\mu/\varepsilon}/\lambda_0}{\sqrt{2}\left[4 + 17\sqrt{\mu\varepsilon}\right]}$$

However, traditional magnetic materials are not suitable for use within the dielectric layer. Conventional magnetic materials with a magnetic permeability greater than 3 at high frequencies (such as frequencies greater than 1 GHz) which also maintain low loss (less than 0.01) cannot be produced on a large scale.

By introducing a suitable magnetic element, the effective μ and ε of the composite follows the effective medium theory by Maxwell-Garnet, where f is the inclusion volume fraction.

$$\mu_{eff} = \mu_i f + \mu_h (1-f)$$

$$\varepsilon_{eff} = \varepsilon_i f + \varepsilon_h (1-f)$$

To implement magneto-dielectric materials with desired μ and ε values, high performance magnets with high μ and low loss in GHz frequencies were developed. High aspect ratio nanostructured magnetic materials present a significant opportunity to improve the magnetic properties in GHz range.

Ferromagnetic materials such as iron and permalloy have very high DC magnetic permeability. Bulk ferromagnetic materials however, with very low electric resistivity, cannot be used at MW frequencies because of high eddy current loss. Ferromagnetic materials (ferrites), such as $NiFe_2O_4$ are used in relatively higher frequency applications because of their higher electric resistivity. However, the low saturation magnetization leads to low ferromagnetic resonance (FMR) frequency (fr) and limit the application into sub-GHz range.

Reducing the magnetic particle dimension and coating each particle with an insulator effectively controls eddy current loss.

Figure 2A:
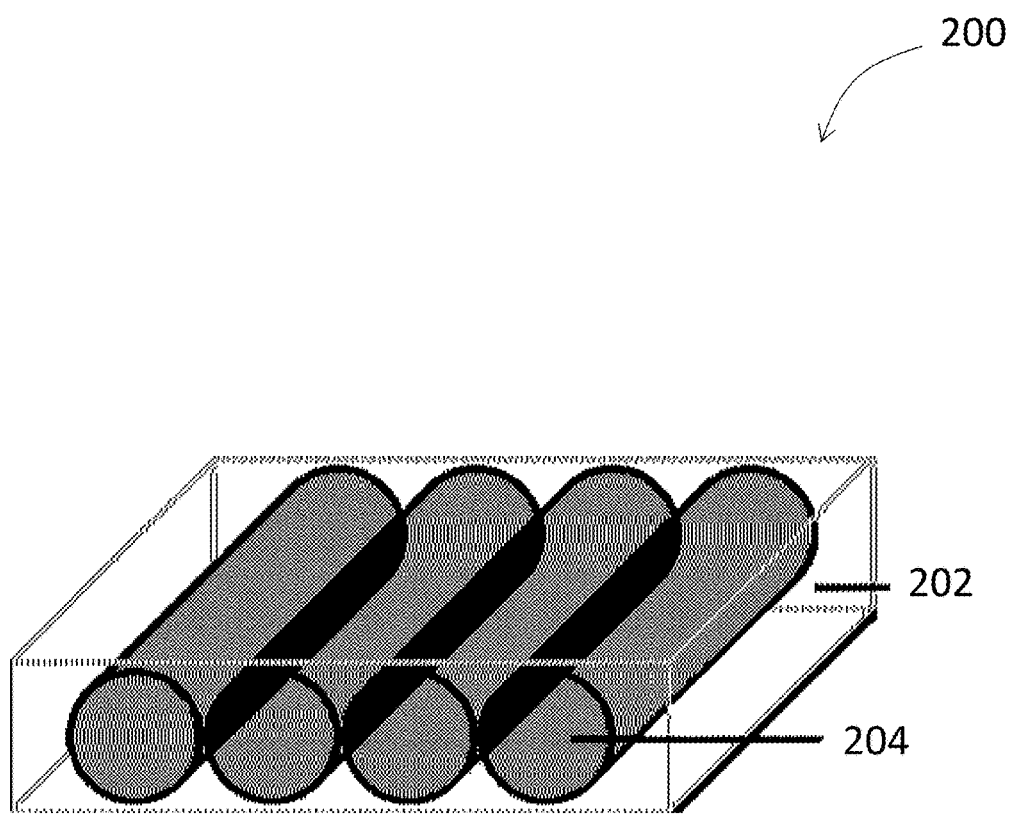
FIG. 2A depicts one embodiment of the invention.

Shown in FIG. 2A is an overview of an embodiment 200 of the invented substrate. The substrate contains magnetic elements, nanofibers 204 embedded within a dielectric layer 202. In another embodiment similar in appearance to FIG. 2A, the fibers 204 are magnetic, but the dielectric layer 202 comprises a piezoelectric polymer, such as Polyvinylidene fluoride (PVDF), in one embodiment. In this embodiment, the substrate includes a piezoelectric component yet eliminates the need for additional piezoelectric coating described below.

Figure 2B:
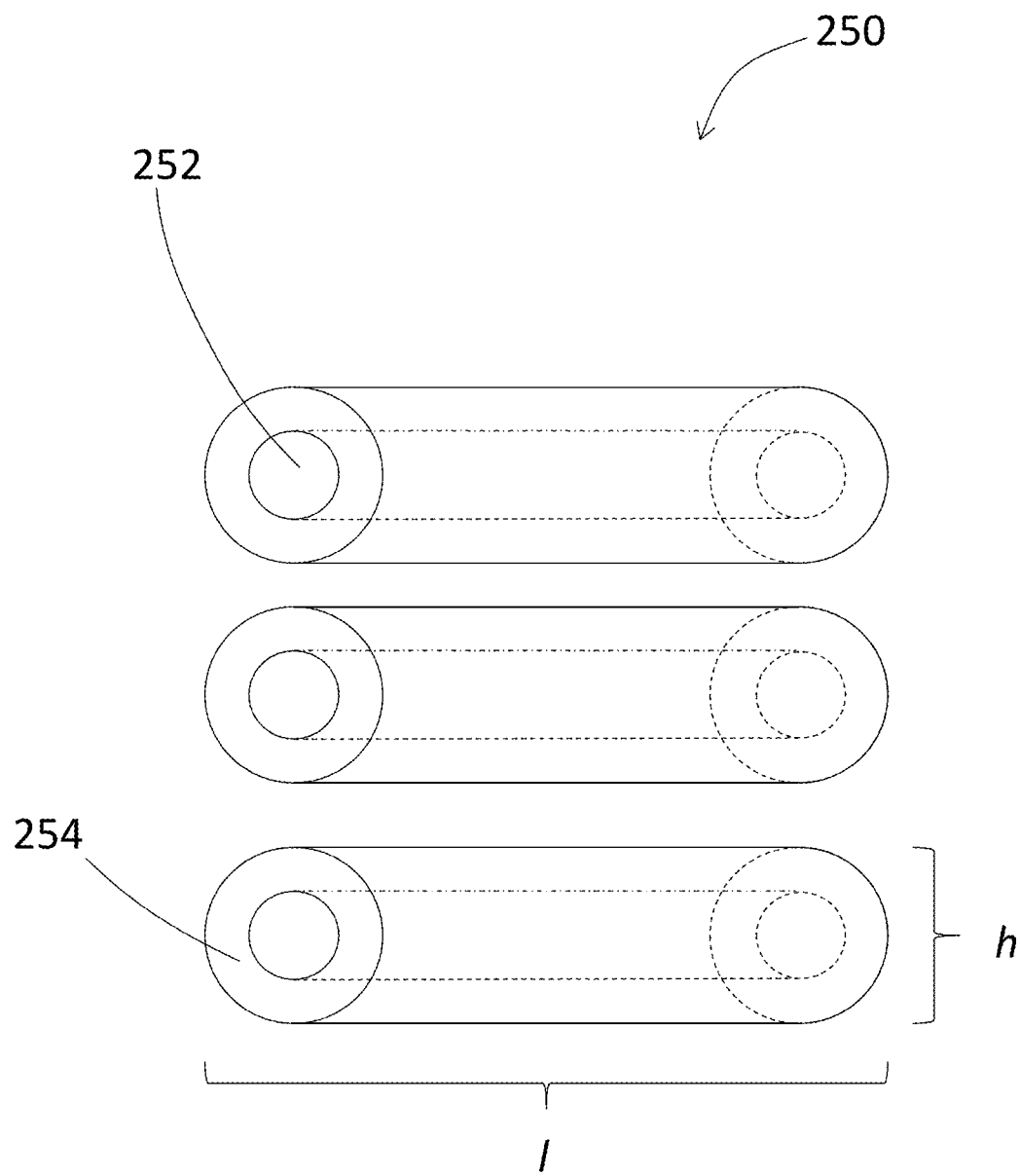
FIGS. 2B and 2C depicts the details of the fibers and shapes used in various embodiments of the invention.

As shown in FIG. 2B, the individual nanofibers 252 comprising the nanofiber-enriched dielectric layer 250 are substantially parallel. The nanofibers have a high aspect ratio, meaning the ratio of length l to diameter (diameter designated as height h) of each nanofiber 254 is 50:1 or higher. While in FIG. 2B, the nanofibers 254 are shown to be approximately equivalent in length, the equivalent length of nanofibers is not a structural requirement. The space between the nanotubes is approximately 5 nm, in one embodiment. However, the number of nanofibers to be located within the dialectic layer 250 is maximized, in one embodiment.

In one embodiment, the nanofibers have a height h of 30 nm and a length l of 3000 nm to 30,000 nm or lengths of 3 to 30 μm.

Figure 2C:
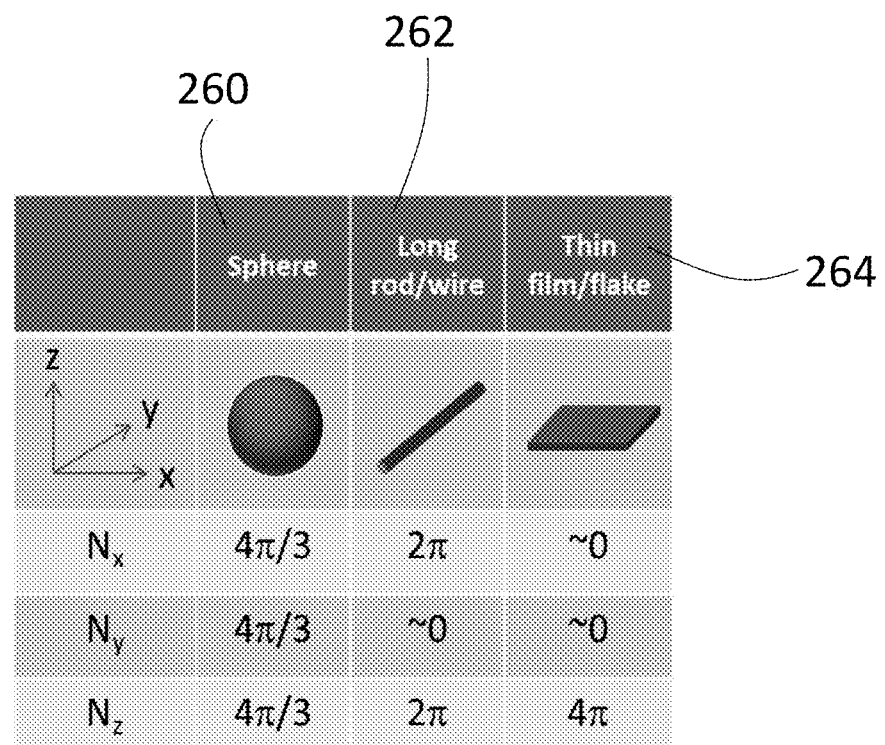

The demagnetizing effect of a finite sized magnetic particle also affects its apparent permeability $\mu_{app}$, the actual permeability a device can use. High aspect ratio shapes (long rods and thin films) can achieve the full permeability in their magnetic easy axis, while spherical shaped magnets only have a $\mu_{app}$ up to 3, even if the intrinsic μ is very high. FIG. 2C depicts various shapes (including a sphere 260, a rod or wire 262 and a film or flake 264) and the corresponding demagnetization factor for each geometry.

$$\mu_{app} = \frac{\mu}{1 + \frac{N}{4\pi}(\mu - 1)}$$

High shape anisotropy also enhances $f_r$, according to the equation:

$$\omega_{res} = \gamma \sqrt{[H_{eff} + (N_x - N_z)M_s][H_{eff} + (N_y - N_z)M_s]}$$

where $N_x$, $N_y$, $N_z$ are the demagnetization factor along x, y, z, direction respectively, $H_{eff}$ is the effective external bias field and γ is the gyromagnetic ratio.

Compared with other systems, such as mechanically deformed metallic flakes, nanofibers have fundamental advantage including higher shape anisotropy, lower eddy current loss and lower stress/defect in magnetic crystals. Magnetic nanofibers with high shape anisotropy maintain high saturation magnetization similar to their bulk counter parts and high permeability in their easy axis.

In one embodiment, Fe—Co magnetic nanofibers are used inasmuch as $Fe_2Co$'s specific composition results in some of the highest available saturation magnetization values. Further, the nanofibers are oxidation resistant. In this embodiment, $f_r$ may be tuned by the fiber composition and fiber dimension (Snoek's law, $\mu f_r \propto M_s$). A trade-off between permeability and $f_r$ and μ could be made as desired by varying $f_r$. For eddy current loss, as long as the dimension of the magnetic entities in the direction perpendicular to the AC magnetic field direction are smaller than the skin depth, the loss tangent due to eddy current is estimated to be less than $10^{-3}$ as expressed as the ratio of the imaginary μ" versus real μ' components. Nanofiber diameter is less than 30 nm, more than one order smaller than the skin depth, in one embodiment.

Another embodiment uses ferrite nanofibers. Ferrites have higher electrical resistivity than ferromagnetic metals. They can be used where the material's loss requirement is critical. $M_s$ is usually smaller than ferromagnetic metal, resulting in a moderate μ value and low FMR frequency. In one embodiment, spinel ferrite is the chosen material. In another embodiment, more complicated hexagonal ferrite nanofibers such as Z-phase cobalt ferrite, which has higher FMR frequency, is used.

Figure 3A:
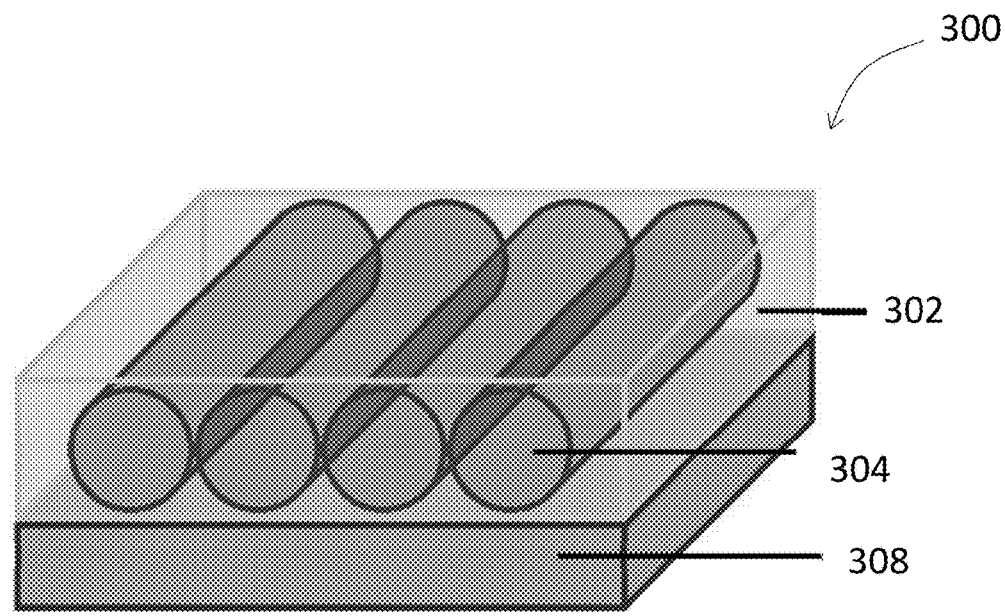
FIGS. 3A-C depict several alternative embodiments of the invention.
Figure 3B:
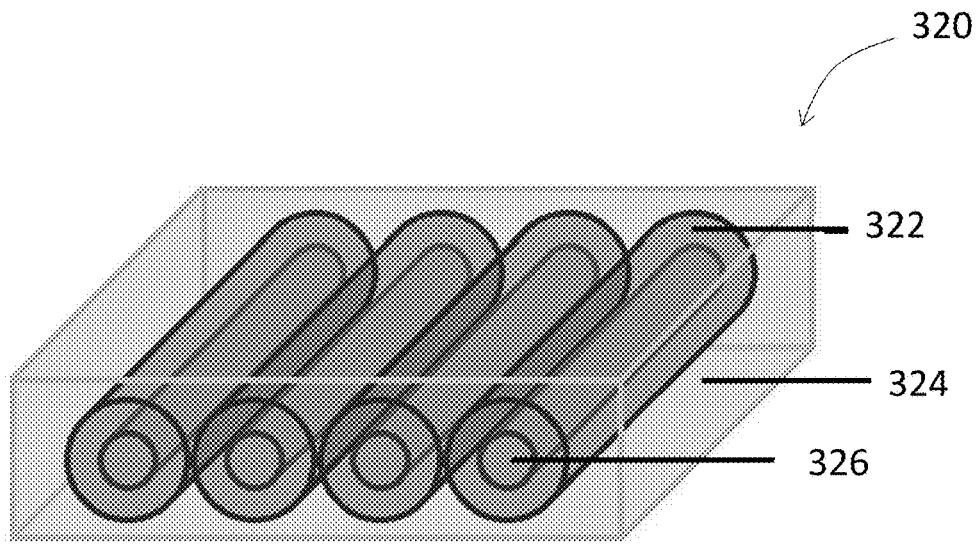
Figure 3C:
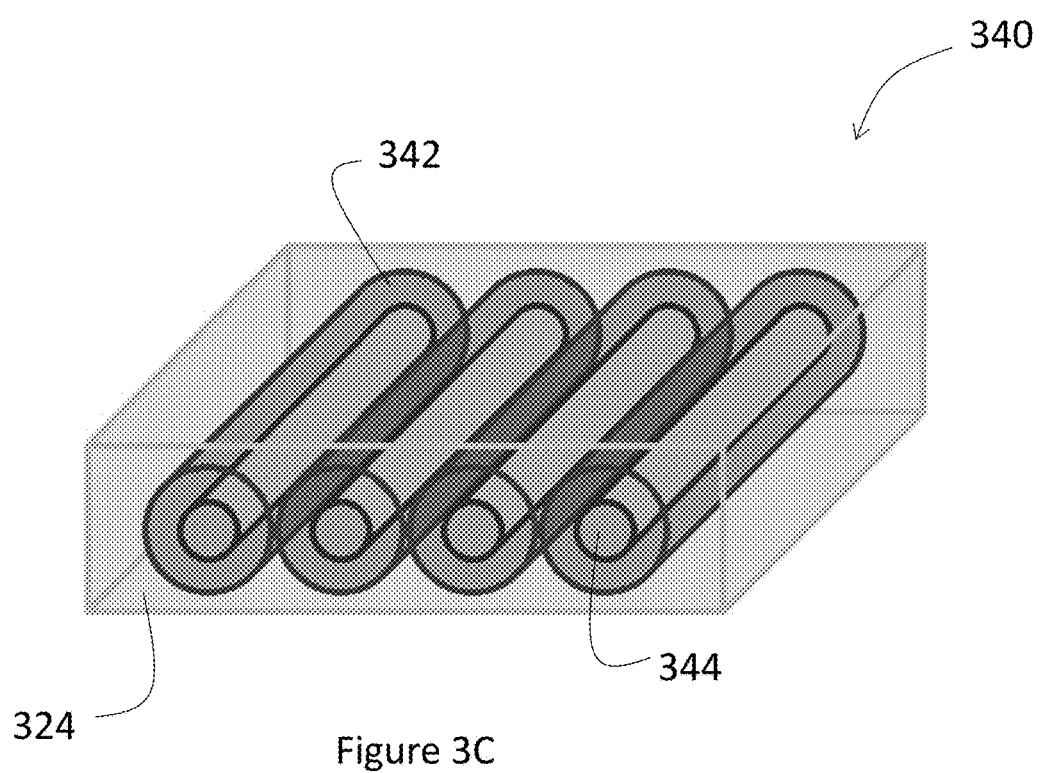

FIGS. 3A to 3C show a number of alternative embodiments. In each embodiment, the elements result in magneto-electric coupling. In each embodiment, at least one component is magnetic, another is piezo-electric. In several components, the polymer layer contributes piezo-electric operation.

Turning to, FIG. 3A, depicted therein is a cross section of embodiment 300 of the dielectric layer of the invention. The dielectric layer 302 is enriched by magnetic nanofibers 304. A ferroelectric layer 308, having piezo electric components, described infra, is also added.

An alternative embodiment 320 is depicted in FIG. 3B. In the alternative embodiment, the dielectric polymer layer 324 contains coated nanofibers 326 embedded in the layer 324. The nanofibers 326 having a ferroelectric layer 322 added thereon. The nanofibers 326 are magnetic while the polymer and the ferroelectric layer 322 coatings are piezoelectric.

A further alternative embodiment 340 is depicted in FIG. 3C. In this embodiment, the dielectric layer 324 contains magnetic nanotubes 342, which in turn contain ferroelectric inserts 344. In this embodiment, the dielectric layer 324 is piezoelectric. The nanotubes 342 are magnetic. Finally, the inserts 344 are also piezo-electric.

While the embodiments shown in FIGS. 2A-3C show the nanostructures close together, the magnetic nanofibers 204, 304, 344 or the magnetic nanotubes 322 do not physically contact one another. Instead, they are either physically separated or are coated with an insulation layer, described below. The resulting substrate features magneto-electric coupling.

Figure 3D:
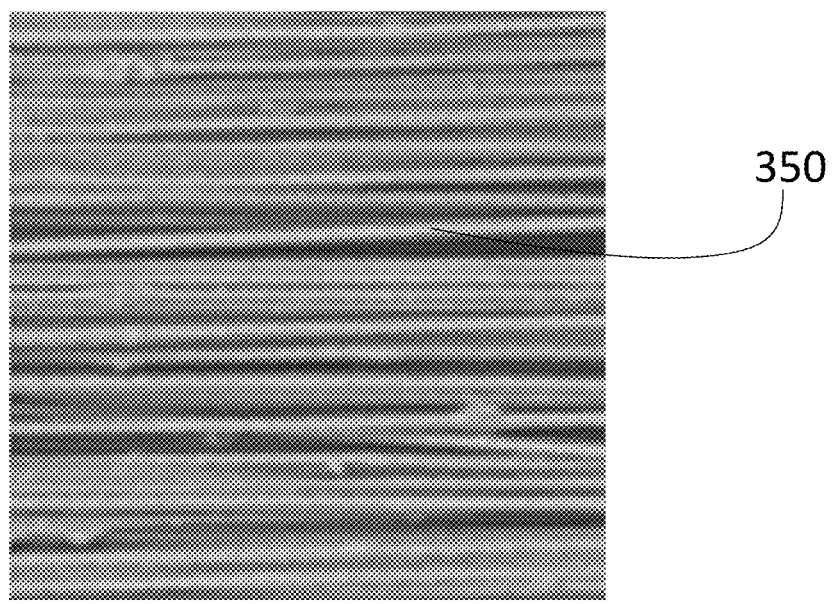
FIG. 3D depicts a micrographs of one embodiment of the invention.

A micrograph of an antenna embodiment is shown in FIG. 3D. In FIG. 3D, the fibers 350 are substantially parallel.

Ferromagnetic Resonance

Figure 4:
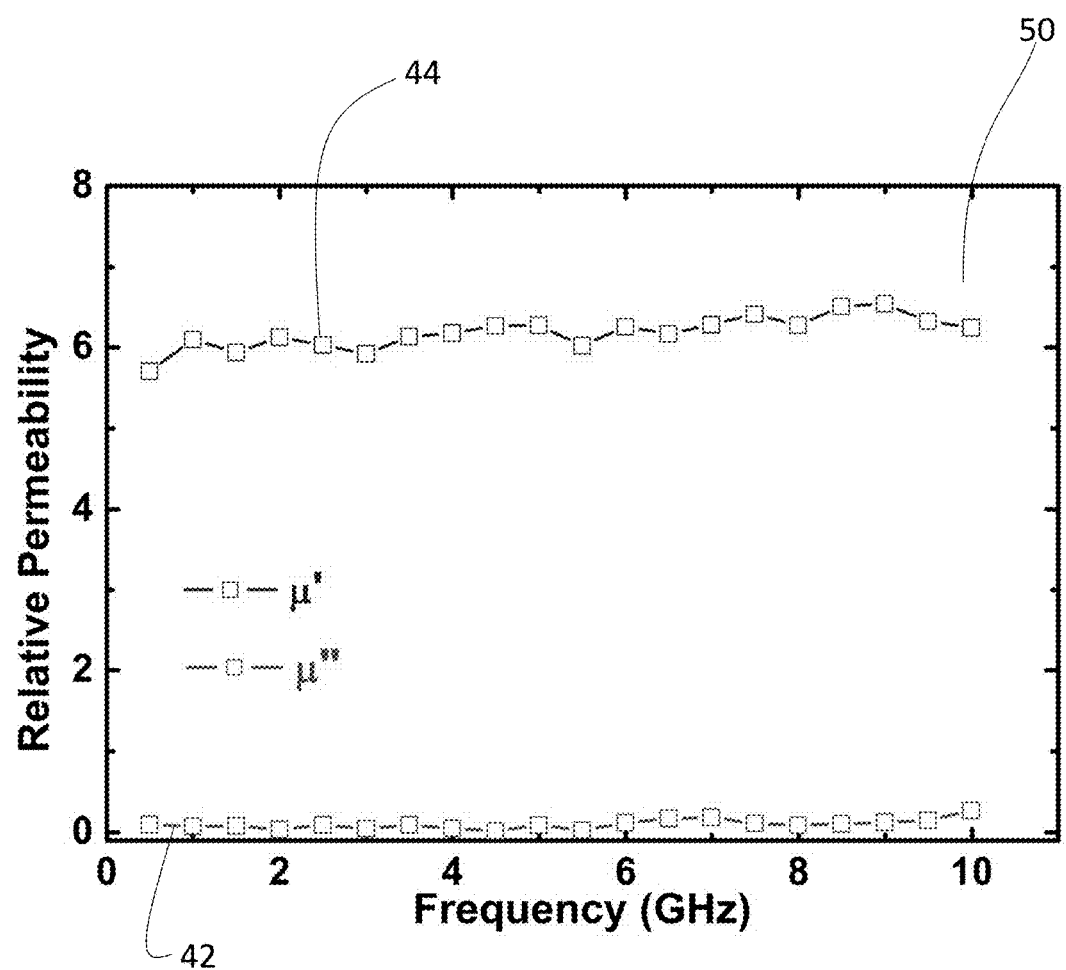
FIG. 4 depicts the magnetic permeability frequency response of one embodiment of the invention.

The ferromagnetic resonance of the substrate 14 is tuned to achieve the desired purpose by the morphology of the nanofibers and the structure (orientation) of the fibers within the dielectric layer. As depicted in FIG. 4, the resonance can be modeled or evaluated using any number of measurements. However, for these calculations two values are the most relevant—a real component ($\mu'$) and an imaginary component ($\mu''$) of the magnetic permeability.

For example, where the resulting substrate is to act as an antenna, the arrangement of the ferromagnetic resonance ($\mu'$ and $\mu''$ components described previously) is selected as shown in FIG. 4. As depicted in FIG. 4, a flat and relatively large $\mu'$ 44 and a small and flat $\mu''$ 42 resulted from the aligned nanofibers. The favorable properties are maintained even at 10 GHz 50. In the embodiment depicted in FIG. 4, the FMR frequency is very high (larger than 10 GHz). Where the substrate 10 is to act as an antenna, then the real component $\mu'$ 44 should be flat while the imaginary component $\mu''$ should be low, and this is achieved in the embodiment shown in FIG. 4.

The quantity of the nanofibers in the fiber layer 16 is maximized in one embodiment. In another embodiment, the quantity of the nanofibers is one of the factors that determine the overall effective permeability of the resulting substrate 10.

The specific implementation details of the tunable antenna are described below.

In several embodiments, 300, 320, 340, the construct generates a magnetoelectric effect in a multiferroic composite. For example, in FIG. 3A, the mechanical coupling of the dielectric 302, with the ferroelectric layer 308, results in a magnetoelectric composite. The effect is produced through strain/stress interaction, which produces electrically controlled magnetic bias. The strain/stress effect, in the optimum case is produced as:

$$H_{eff} = 3\lambda_S \sigma_E / M_S$$

where $H_{eff}$ is induced by strain/stress produced by the piezoelectric component in multiferroic structure, $\lambda_s$ is the magnetostriction of the magnetic element and $\sigma_e$ is the electric field induced biaxial stress of the piezoelectric component.

In other embodiments, a strain/stress interaction is not used for coupling.

Insulation Layer

As shown, for example, in FIG. 3B, some embodiments of the composite 320 include a magnetic nanofiber 326 surrounded by a paramagnetic or antiferromagnetic insulation layer 322. The insulation layer 322 is important as the nanofibers are metallic. When the coating layer is antiferromagnetic (such as NiO), it may also magnetically couple to the ferromagnetic fiber and act as a pinning layer to the magnetic domains inside the ferromagnetic fiber, further reduce the magnetic loss due to domain wall movement inside the nanofibers hence reduce the overall microwave loss in the GHz range. In some embodiments described below, the nanofibers substantially overlap. Even in embodiments where the nanofibers are substantially parallel, the density of the nanofibers is high, the nanofibers 326 may form conductive paths within the composite 320. With a conductive path, the composite 320 would become a radio frequency reflector. Therefore, in some embodiments, the composite 320 includes fibers 326 which are also coated 322. The insulating layer 322 is added before the time of the addition of the building of the nanofiber layer 320.

In one embodiment, the insulation layer 322 is added to individual fibers by a process of atomic layer deposition (ALD). The resulting layer can be as thin as only about one nanometer thick, and thickness can be precisely adjusted to optimize magneto-electric effect and balance the magnetic/dielectric properties The insulation layer 322 comprises piezoelectric materials and an electric field is used to adjust the functioning parameters of the substrate. In one embodiment, additional piezoelectric elements are suspended in the dielectric layer 324. As such, the insulation layer composition is used to not only prevent conductive paths from forming, but also to adjust the antenna in the field of use.

In embodiments where the orientation of the nanofibers 326 is controlled, such as an embodiment where the orientation is controlled through extrusion or 3-dimensional printing, the insulation layer 322 is omitted as damaging conductive paths will not be allowed to form.

In addition to providing for electric insulation, the layer 26 facilitates the tune-ability of the substrate by coupling magnetic and electric fields.

Impedance Matching and Permeability

For a tunable antenna, impedance matching is important to minimize signal reflection.

In one embodiment, the side of the substrate 14 exposed to the atmosphere, impedance matching is achieved by having a matching permeability and permittivity, as air has both values equal to one. By introducing magnetic elements, the impedance matching can be achieved by optimizing the magnetic value p:

$$\text{impedance} = \sqrt{\frac{\mu}{\varepsilon}}$$

The resulting substrate may achieve impedance value approaching to that of surrounding atmosphere (approximately 1) while prior art approaches have impedance values of 0.2. Conventional materials are limited in the ability to match impudence.

Figure 5:
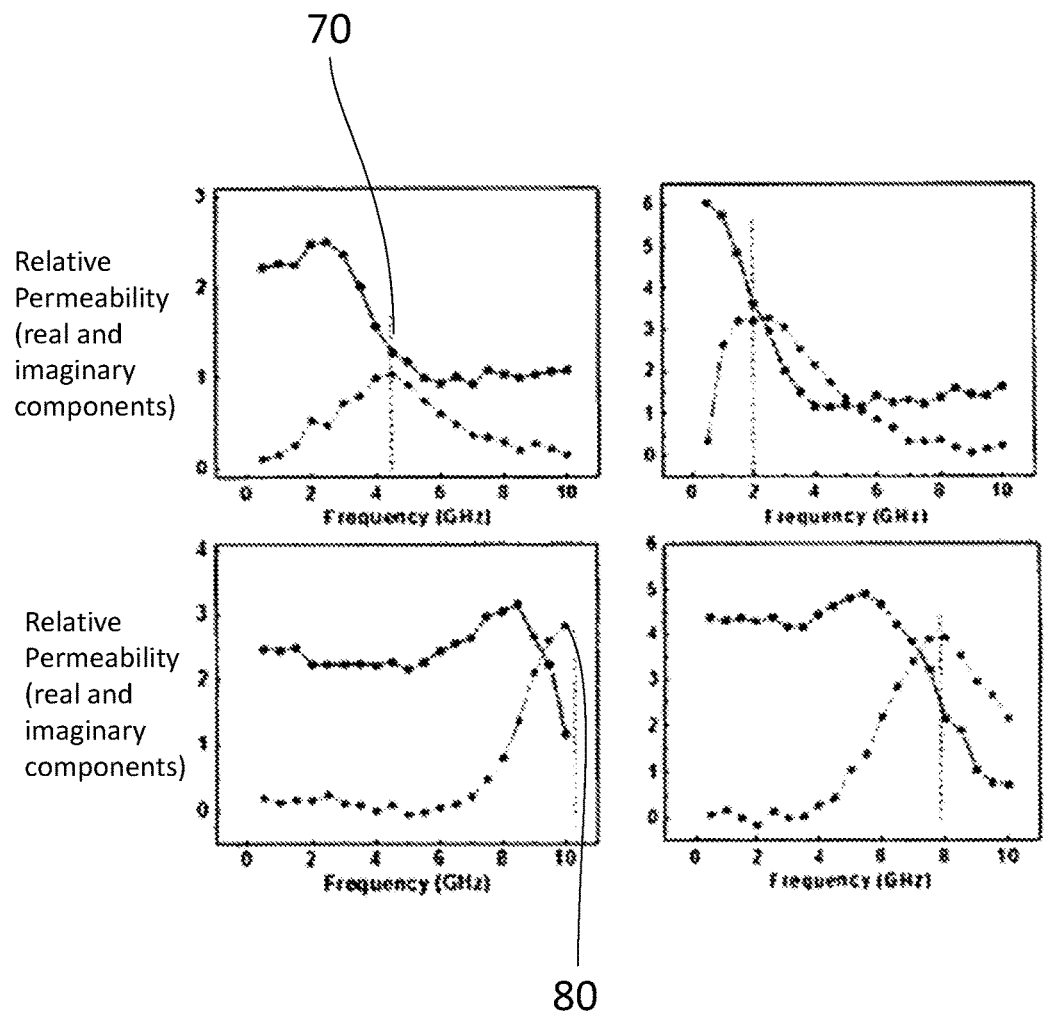
FIG. 5 depicts performance characteristics of another embodiment of the invention.

Turning to FIG. 5, depicted therein are the permeability spectrum measurements of several nickel ferrite (ferrimagnetic) nanofibers. As can be seen in FIG. 4, the $f_r$ of the nanofiber layer can be increased to 5 GHz or local maxima 70, without a bias field, and 10 GHz or local maxima 80, with a bias field. As shown in FIG. 5, bias matching is achieved by use of the structure and introduction of a magnetic bias field.

For ferromagnetic nanofibers, the $f_r$ can be moved to a value greater than 20 GHz inasmuch as the ferromagnetic nanofibers have a higher $M_s$ and so have a higher permeability at these frequencies.

In one embodiment, the optimum $f_r$ value is a wide range of frequencies. The width of the peak width values is produced by random in-plane 1-D anisotropy of the system.

In one embodiment, the substrate 10 generates a magnetoelectric effect in a multiferroic composite. The effect is produced through strain/stress interaction, which produces electrically controlled magnetic bias. The strain/stress effect, in the optimum case is produced as:

$$H_{eff} = 3\lambda_S \sigma_E / M_S$$

where $H_{eff}$ is induced by strain/stress produced by the piezoelectric component in multiferroic structure, $\lambda_s$ is the magnetostriction of the magnetic element and $\sigma_e$ is the electric field induced biaxial stress of the piezoelectric component.

Tuneability

The tuneability of the substrate 14 occurs due to two structural features of the substrate. First, permanent frequency response is permanently set during manufacture, in one embodiment. A second, real-time tune-ability is made possible due to magnetoelectric coupling with the piezoelectric coating.

In one embodiment, a bilayer heterostructure is used having a magnetic and piezoelectric layers. The magnetic layer is formed using an alloy of Iron Gallium Boron. The piezoelectric layer comprises lead magnesium niobate and lead titanate or lead zinc niobate along with lead titanate. In another embodiment, a core-shell structure is used. The use of the bilayer allows the optimum frequency of the antenna to be switched by up to 10 GHz, which is achieved by applying a voltage impulse to the bilayer. The resulting antenna frequency may therefore be tuned up the K band (18 to 27 GHz) by switching the resonance frequency peaks. This embodiment is therefore tunable using a solid state component.

The bilayer structure is built using an organic based film formulation containing polystyrene, in one embodiment. This embodiment results in a high magnetic loading and good adhesion of the nanofibers layer 14 to the piezoelectric layer 12. The piezoelectric layer 12 can further be readily manufactured using conventional means and the resulting film will be mechanically pliable and compliant.

Figure 6:
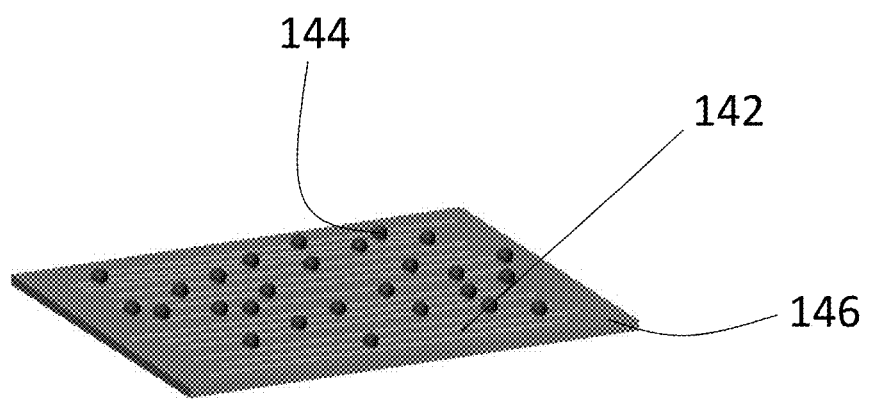
FIG. 6 depicts an embodiment of the invented antenna.

An example tuneable antenna embodiment 146 is depicted in FIG. 6. In this embodiment, in-plane aligned nanowires 142 are deposited on the dielectric substrate 146. The substrate also includes dielectric particles 144, in one embodiment, to increase the tune-ability of the substrate. The substantially parallel in-plane fiber arrangement results in 1-d anisotropic in-plane permeability, which allows the antenna substrate to have increased directivity. The nanowires 142 are arranged substantially parallel and are substantially straight. While the quantity of the nanowires 142 is maximized, the nanowires are not allowed to form electrical circuits. In one embodiment, in order to avoid the formation of electrical continuity, the nanowires 142 are enriched with an insulating material. In another embodiment, the arrangement of the nanowires 142 prevents formation of connectivity.

Dielectric particles 144 are depicted in FIG. 6. While in FIG. 6 the particles 144 are shown as substantial spheres, however, in other embodiments other shapes are used, such as droplets or cube-like, and other shapes. The dielectric particles 144 result in impedance match between the magnetic and electric components. However, they are not required in all embodiments.

In one embodiment, the dielectric particles 144 comprise $BaTiO_3$. The particles are chosen for their high dielectric constant and are dispersed in the polymer matrix to tailor permittivity.

Figure 7A:
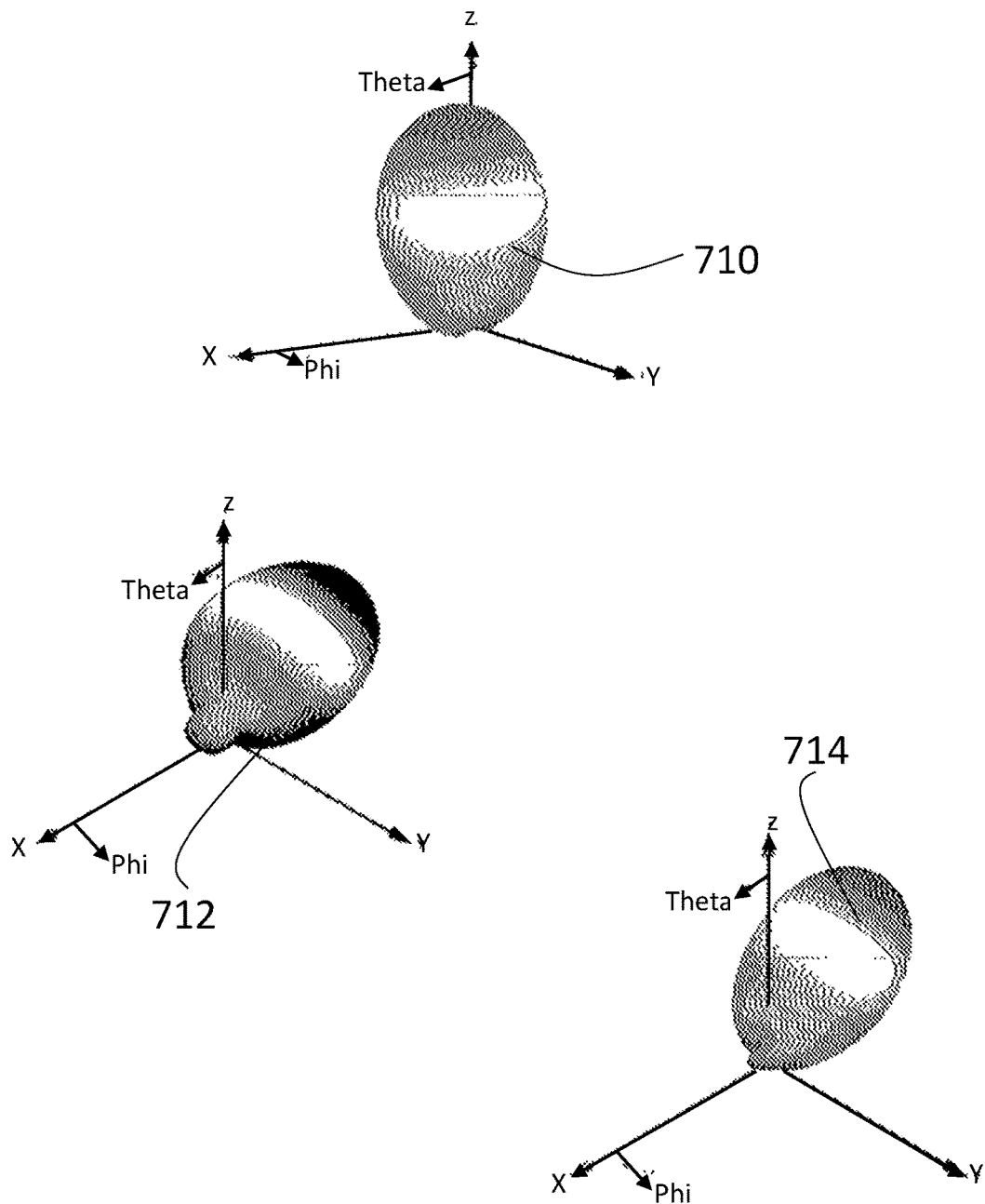
FIG. 7A depicts an overview of an adaptive antenna array embodiment of the invention.

As shown in FIG. 7A, the system may be employed to create a responsive antenna. In one embodiment 710, the antenna includes only a dielectric substrate. In a second embodiment 712, the antenna includes both a dielectric substrate and a 10 Oe magnetic bias field. Finally, in another embodiment, the antenna 714 includes both a magneto-dielectric substrate with a 200 Oe magnetic bias field. Once the antenna substrate has effective magnetic properties, such as antennas 712 and 714, the directivity of the antenna can be significantly affected by magnetic bias, providing an very effective opportunity to "steer" the antenna radiation pattern by magnetic bias field, even on a single antenna. In one embodiment, this capability is applied to an antenna array, which results in a much broader effective operating range and powerful beam forming capabilities.

In conventional systems, a magnetic bias needed for the beam steering is provided by a magnetic coil. Such solutions, however, result in bulky and energy inefficient constructs. In one embodiment, the system uses magnetoelectric coupling to induce magnetic bias via application of electrical voltage. This embodiment is extremely compact (virtually no additional volume/mass) and very energy efficient, due to its use of nanofibers.

Figure 7B:
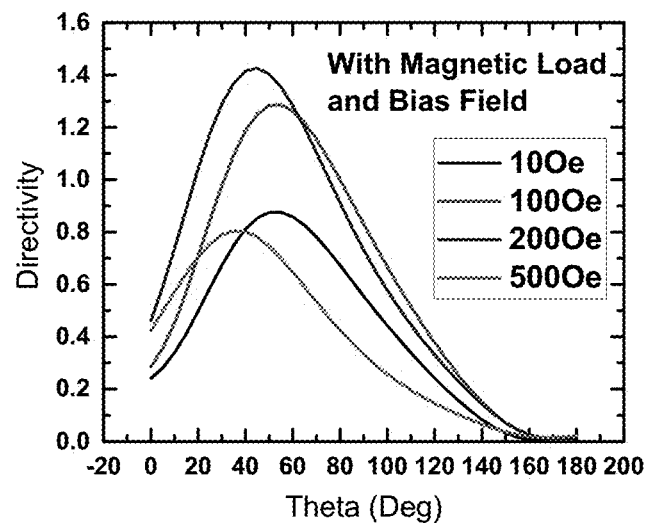
FIG. 7B depicts performance characteristics of an adaptive antenna.

The Magnetic Load and Bias Field relationship is shown in FIG. 7B. As shown in FIG. 7B, the midrange bias field values of 100 Oe and 200 Oe provide large directivity over a large number of angle values. However, 500 Oe and 10 Oe bias fields have applications, in some embodiments.

Nanofiber Sources

Figure 8:
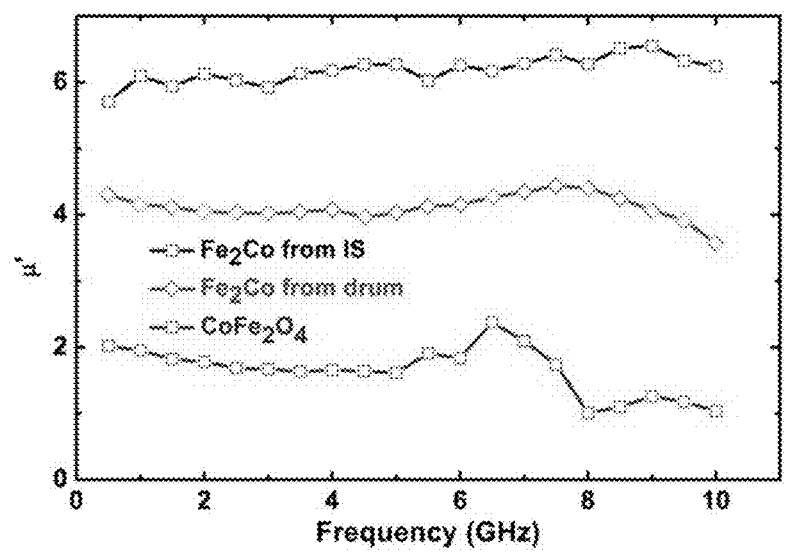
FIG. 8 depicts the dielectric permittivity components of various sources of nanofibers as used in different embodiments of the invention.

As shown in FIG. 8, the permittivity values and the loss performance for various sources of the nanofibers have some variability. Optimum permittivity values are found for aligned metallic magnetic fibers formed by integrated electro-spinning system, as described in applicant's own earlier patent application Ser. No. 14/803,339, the contents of which are incorporated herein by reference.

In order to function within the system, the fibers must be separated from one another without electrical contact. The fibers cannot be interconnected into each other, as in most common electro-spun fibers. The process of fiber manufacturing described in the applicant's '339 application results in fibers suitable to these applications.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The invention claimed is:

1. A substrate for receiving microwave signals comprising:
   a base layer having tunable elements; and
   a nanofiber layer comprising magnetic nanofibers;
   wherein said nanofibers have an aspect ratio of length to diameter of each nanofiber is at least 50 to 1; and
   wherein said nanofiber layer is embedded in the base layer.

2. The substrate of claim 1 wherein said tunable elements comprise a bilayer structure having a magnetic layer and a piezoelectric layer.

3. The substrate of claim 1 wherein said nanofiber layer comprises nanofibers having an insulating coating.

4. The substrate of claim 3 wherein said insulating coating comprises a sputtered layer of aluminum oxide.

5. The substrate of claim 3 wherein said nanofibers having said insulating coating are arranged in a non-overlapping pattern and said substrate is used in conjunction with an antenna.

6. The substrate of claim 1 wherein nanofibers comprising the nanofiber layer are arranged in a non-overlapping pattern and said substrate is used as an antenna.

7. The substrate of claim 1 wherein said nanofibers are flexible.

8. The substrate of claim 1 wherein said substrate comprises a self-biased magnetic material.

9. The substrate of claim 1 further comprising nanoparticles dispersed within the substrate.

10. The substrate of claim 9 wherein said nanoparticles result in impedance match between the magnetic and electric components.

11. The substrate of claim 1 further comprising nanoparticles dispersed within the base layer.

12. The substrate of claim 11 wherein said nanoparticles result in impedance match between the magnetic and electric components.

* * * * *